United States Patent
Rotzoll et al.

(10) Patent No.: US 8,526,832 B2
(45) Date of Patent: Sep. 3, 2013

(54) SHUTTER-GLASS EYEWEAR COMMUNICATIONS RECEIVER

(75) Inventors: Robert R. Rotzoll, Cascade, CO (US); Roger Landowski, Erie, CO (US); Douglas J Gorny, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 242 days.

(21) Appl. No.: 13/102,851

(22) Filed: May 6, 2011

(65) Prior Publication Data

US 2012/0113335 A1    May 10, 2012

Related U.S. Application Data

(60) Provisional application No. 61/332,680, filed on May 7, 2010.

(51) Int. Cl.
*H04B 10/06* (2011.01)
*H04B 10/60* (2013.01)

(52) U.S. Cl.
CPC ................. *H04B 10/60* (2013.01)
USPC .............................. 398/212; 398/207

(58) Field of Classification Search
USPC ................ 398/202–204, 207, 208, 212
See application file for complete search history.

(56) References Cited

U.S. PATENT DOCUMENTS

| | | | |
|---|---|---|---|
| 7,003,271 B2 * | 2/2006 | Kluge et al. | 455/240.1 |
| 7,099,679 B2 * | 8/2006 | Rainish et al. | 455/506 |
| 7,218,850 B2 * | 5/2007 | Stuart | 398/26 |
| 7,218,896 B1 * | 5/2007 | Venkatesh | 455/73 |
| 7,385,467 B2 * | 6/2008 | Stoemmer et al. | 333/189 |
| 7,884,680 B2 * | 2/2011 | Raidl et al. | 331/167 |

OTHER PUBLICATIONS

VESA Standard Connector and Signal Standards for Stereoscopic Display Hardware, Version 1, Vesa Electronics Standards Association (Nov. 5, 1997).

* cited by examiner

*Primary Examiner* — Dalzid Singh
(74) *Attorney, Agent, or Firm* — Baker & McKenzie LLP

(57) ABSTRACT

Shuttering eyewear used to view 3D imagery and/or dual-view images may utilize an IR receiver filter with moderate to wide bandwidth to pass data sidebands of an on-off keying signal while strongly rejecting nearby interference sources. Filtering of the signal may be achieved via a circuit for passing data sidebands of infrared signals. The circuit may include a band pass filter with a low value of Q operable to filter out a first type of interference signal from a signal, a plurality of mixers operable to receive the signal from the band pass filter, wherein the plurality of mixers down converts the signal to baseband signals, and a plurality of low pass filters operable to receive the baseband signals from the plurality of mixers, wherein the plurality of low pass filters rejects a second type of interference.

10 Claims, 3 Drawing Sheets

SHUTTER-GLASS EYEWEAR COMMUNICATIONS RECEIVER

CROSS-REFERENCE TO RELATED APPLICATIONS

This application claims priority to U.S. Provisional Patent Application Ser. No. 61/332,680, filed May 7, 2010, entitled "Shutter-glass eyewear communications receiver," the entirety of which is herein incorporated by reference.

TECHNICAL HELD

This disclosure generally relates to a communications receiver and, more specifically, relates to an infrared communications receiver.

BACKGROUND

Shuttering eyewear (or shutter glasses) can be used to enable stereoscopic 3D and to provide different images to two viewers using a single display, known as Dual View. These devices utilize an infrared (IR) signal generated by an IR emitter which may be compliant with VESA. Standard Connector and Signal Standards for Stereoscopic Display Hardware, Version 1 (Nov. 5, 1997), which is herein incorporated by reference. As described in the standard, an emitter outputs a very simple pulse width modulated signal to indicate which eye to activate. The eyewear responds by performing a hard-coded sequence of switching events that open and close the eyewear shutters in order to achieve the desired visual effect. The hard-coded switching sequence is generally either a compromise that provides acceptable performance for a small set of displays or is optimized for a single display.

BRIEF SUMMARY

Disclosed is an IR receiver filter with moderate to wide bandwidth to pass data sidebands of an on-off keying (OOK) signal while strongly rejecting nearby interference sources. Such a technique substantially eliminates the problems associated with a narrow bandwidth single-resonator band pass filter structure and substantially avoids multi-resonator band pass filters.

According to an aspect, generally, the present application discloses stereoscopic eyewear for receiving infrared signals including a first and second lens, a circuit for passing data sidebands of infrared signals, and a frame. The first lens and second lens each include a liquid crystal shutter. The circuit for passing data sidebands of infrared signals may include a band pass filter with a low value of Q operable to generate a filtered signal by filtering out a first type of interference from a received infrared signal. The circuit also may include a plurality of mixers operable to receive the filtered signal from the band pass filter, wherein the plurality of mixers down converts the filtered signal to baseband signals. The circuit may also include a plurality of low pass filters operable to receive the baseband signals from the plurality of mixers, wherein the plurality of low pass filters rejects a second type of interference. The frame holds the first lens, the second lens, and the circuit for passing data sidebands of the infrared signals.

According to another aspect, generally, the present application discloses a method for filtering infrared signals to pass data sidebands of the infrared signals. The method includes substantially filtering out high frequency interference from an infrared signal by utilizing a band pass filter with a low value of Q. The method also includes down-converting the infrared signal to a baseband signal by utilizing a plurality of mixers. The method also includes rejecting near-carrier frequency interference from the baseband signal by utilizing a plurality of low pass filters.

According to yet another aspect, generally, the present application discloses a circuit for receiving and filtering infrared signals to pass data sidebands of the infrared signals that includes a photodiode, a pre-amplifier, an amplifier, a band pass filter, a plurality of mixers, and a plurality of low pass filters. The photodiode is operable to convert light pulses to current pulses. The pre-amplifier is operable to convert the current pulses to a voltage. The amplifier is operable to adjust the voltage. The band pass filter is operable to filter out a first type of interference signal from the voltage. The plurality of mixers is operable to receive a filtered signal from the band pass filter and to down convert the filtered signal, thereby creating a down converted signal. The plurality of low pass filters is operable to receive the down converted signal and to filter out a second type of interference.

DETAILED DESCRIPTION

Following is a description of a direct-conversion infrared receiver.

Conventional Carrier-Based Communications Receiver

Figure 1:
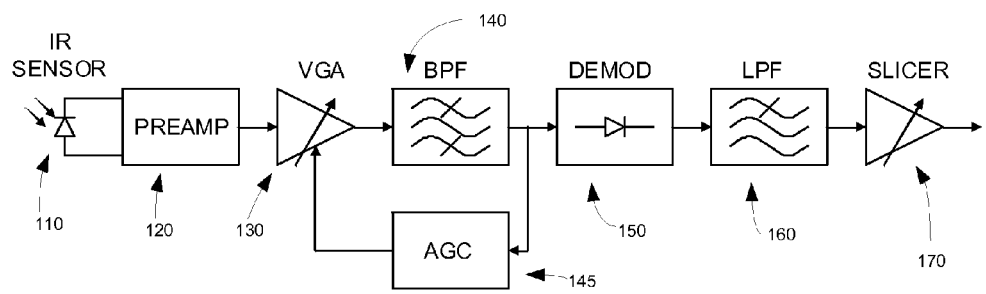
FIG. 1 is a schematic diagram of a conventional infrared receiver.

FIG. 1 is a schematic diagram of a conventional infrared (IR) receiver 100 for carrier-based on/off keying (OOK) transmission including automatic gain control (AGC). In operation, the IR photodiode sensor 110 converts the light pulses to current pulses which then are converted to a voltage via a preamplifier 120 configured as a trans-impedance amplifier. The voltage level is adjusted by a variable-gain amplifier (VGA) 130 under control of the AGC block 145. The VGA 130 output is then passed through a band pass filter (BPF) 140 after which demodulation of the carrier pulses is performed by an envelope detector (DEMOD) 150. The demodulated signal is then low pass filtered (LPF) 160 and is sent to a slicer (SLICER) 170. The slicer 170 is a comparator with a reference level related to the expected signal at the band pass filter 140 output and generates a logic output commensurate with the transmitted data modulation. The AGC block 145 controls the VGA 130 gain to stabilize the signal level at the output of the band pass filter 140.

Further in FIG. 1, if the band pass filter 140 did not exist, the envelope detector 150 will respond to changes in the amplitude of the input signal. The band pass filter 140 is designed to attenuate the effects of interfering signals and random noise, while passing the desired signal to the demodulator 150.

Figure 2:
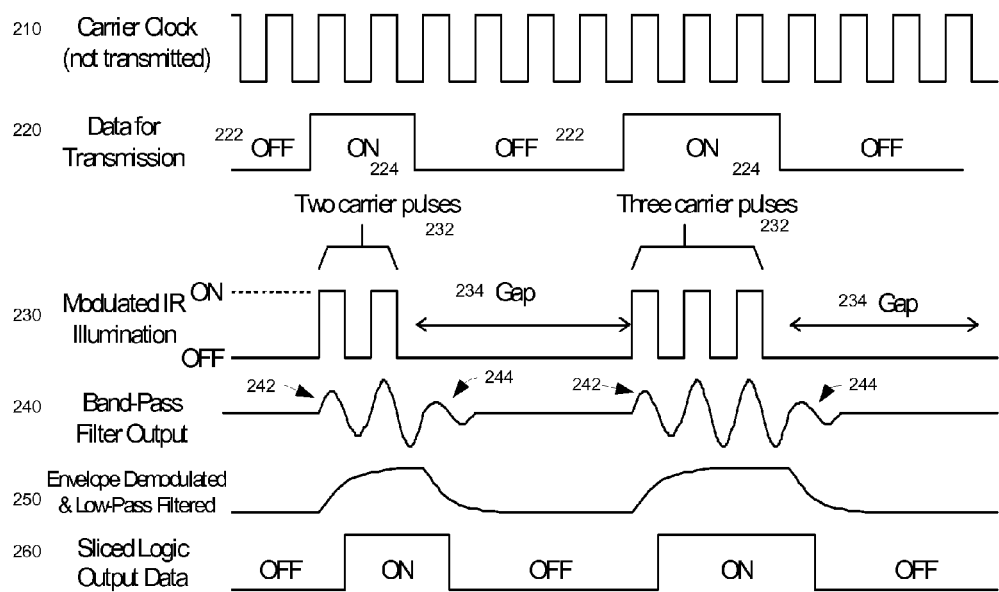
FIG. 2 is a schematic diagram of conventional infrared analog front end signals.

FIG. 2 is a schematic diagram illustrating conventional infrared analog front end signals 200. In a carrier-based system, multiple sequential pulses are sent at the frequency of the carrier, illustrated as the carrier clock 210 in FIG. 2, Gaps in the pulse sequence are used to implement a type of on-off keying (OOK) modulation that can be extracted by the envelope detector. In the associated system IR transmitter, the Data for Transmission 220 is a series of logic levels comprising ON states 224 or OFF states 222. During the ON states 224, the carrier clock is passed to the IR illumination emitter, illustrated as the modulated IR illumination 230 in FIG. 2. The two carrier pulses 232 are also shown in FIG. 2. During the OFF states 222, the IR illumination is disabled, illustrated as the gap 234 in the modulated IR illumination 230. In the receiver, the modulated IR waveform arrives and is amplified prior to the band pass filter. For a preferred signal, with no interference or noise, the band pass filter limits the sideband energy of the signal, as shown in the band pass filter output 240. This results in a removal of the original DC level from the photodiode and a rounding of edges appears as sine waves 242 that appear during the times of ON data. The filter may ring a small amount which results in one or more additional cycles 244 after the carrier pulses have disappeared. Similarly, it takes more than one carrier pulse to achieve the full signal level at the beginning of the ON period, shown as sine wave 242, at the output of the band pass filter. As illustrated in FIG. 2, the first carrier pulse and the last carrier pulse are not full signals.

In operation and as shown in FIG. 2, the envelope demodulated and low pass filtered signal 250 responds to the changes to the output signal from the band pass filter. The sliced logic output data 260 generates a logic output commensurate with the transmitted data modulation.

There are significant interference sources that can disrupt a conventional IR data communications link Assuming that a carrier frequency is chosen where little interference exists, a receiver with a wide band pass filter allows this interference through to the demodulator after which it may appear in the logic output. Prior art designs tend to use structures in which a single complex pole-pair defines a single resonator as the band pass filter. The bandwidth of this filter is controlled by its quality factor or Q. As Q increases, the filter bandwidth narrows and the resultant ringing effects increase. An upper bound on Q for a given technology may exist, that if exceeded causes the resonator to become an oscillator itself. The desired filter has a brick-wall cutoff behavior that the single resonator cannot achieve. Therefore, multiple resonator circuits can be constructed as for radio applications. However, power consumption increases dramatically for op-amp based circuits and tuning accuracy of the center frequency and bandwidth of the filter become critical and does not achieve acceptable tolerances resulting in system failure.

Figure 3:
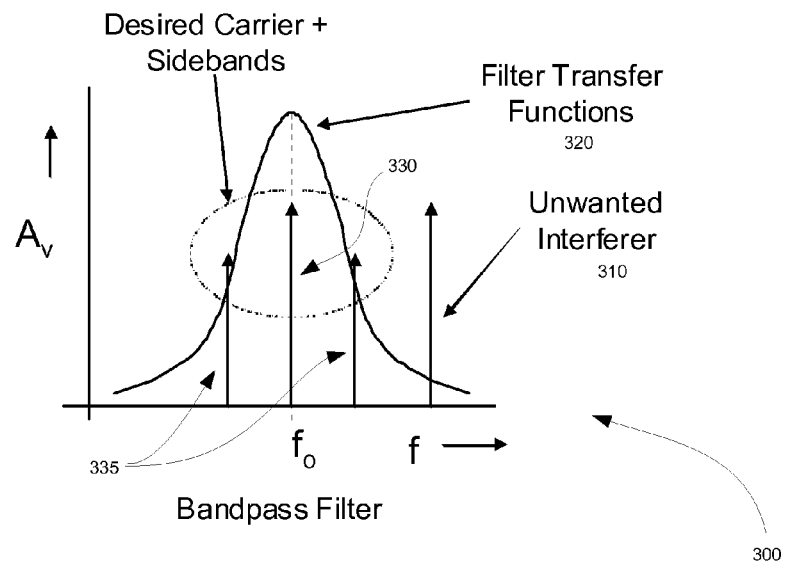
FIG. 3 is a schematic diagram of conventional infrared analog front end signals.

FIG. 3 is a schematic diagram illustrating conventional IR analog front end signals 300. A typical situation is depicted in FIG. 3. The band pass filter is a single resonator and the signal uses a relatively high modulation rate resulting in a wide bandwidth. As illustrated in FIG. 3, the filter transfer functions 320 rejects unwanted interferer 310, but keeps the desired carrier 330. Additionally, the desired signal sidebands 335 is rejected as the sidebands 335 fall outside of the filter transfer functions 320. If the Unwanted Interferer 310 is to be rejected, then the filter Q is very high. However, increasing the Q restricts the bandwidth so that the desired signal sidebands begin to be rejected as illustrated in FIG. 3. Thus, rejection of near-frequency interference works against the desired signal. A filter with a wide bandwidth but steeper rejection slopes supports such a situation.

What is needed is a technique and apparatus to achieve an IR receiver filter with moderate to wide bandwidth to pass data sidebands of an OOK signal while rejecting nearby interference sources. Such a method may substantially eliminate the problems associated with a narrow bandwidth single-resonator band pass filter structure and substantially avoids multi-resonator band pass filters.

Carrier-Based Communications Receiver Design

Figure 4:
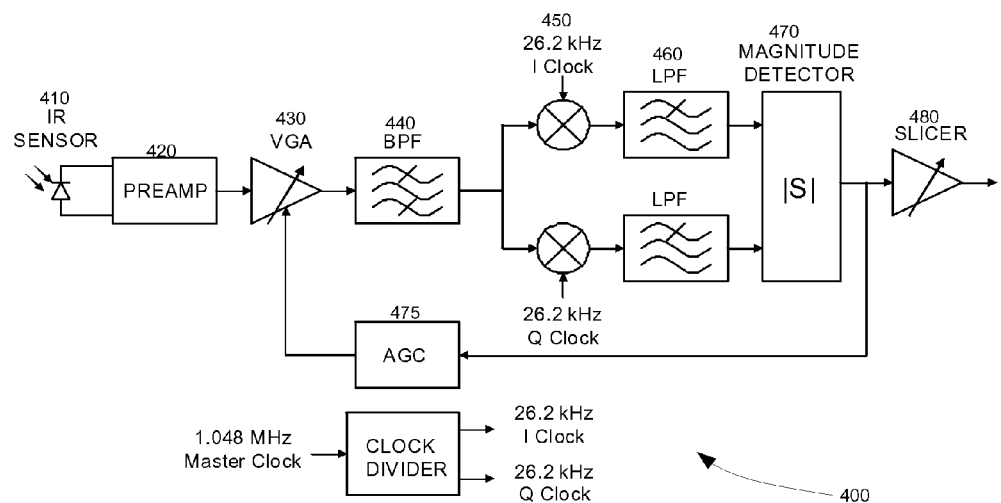
FIG. 4 is a schematic diagram of an embodiment of an infrared receiver, in accordance with the present disclosure.

FIG. 4 is a schematic diagram of an embodiment of an analog front end (AFE) receiver 400. This circuit includes an IR sensor 410, a preamplifier 420, variable-gain amplifier 430, and band pass filter 440, as well as two mixers 450, low pass filters 460, and a magnitude detector 470 followed by a slicer 480. The two mixers 450, low pass filters 460 and magnitude detector 470 may form a direct-conversion receiver for an on-off keyed (OOK) or amplitude-shift keyed (ASK) signal. The second mixer inputs may be driven in quadrature phase or approximately 90 degrees out-of-phase at the carrier frequency by an oscillator in the receiver. The magnitude detector 470 may perform a squaring operation on each low pass filter output individually, may add the squared results and then may take a square root to produce the detector output. Utilization of the magnitude detector 470 may allow for considerable error of the receiver oscillator frequency and phase as compared to that in the transmitter. The AGC block 475 may control the VGA 430 gain to stabilize the signal level at the output of the band pass filter 440. Although the elements of the embodiment discussed in FIG. 4 are arranged in a particular sequence, the configuration of the elements may vary in accordance with the embodiments discussed herein.

The circuit of FIG. 4 has many benefits, wherein one such benefit may be that the band pass filter 440 may not act as the primary interference filter and instead the low pass filters 460 may perform substantially all near-carrier frequency interference filtering. Since the low pass filters 460 may operate at base-band, the filter order for removing interference may be much lower than for the band pass filter 440. Also, the accuracy and noise levels of the low pass filters 460 may be better than for the band pass filter 440. The resulting system illustrated in FIG. 4 may perform more predictably by rejecting nearby interferers while substantially maintaining the overall specification of carrier signal demodulation. Although the receiver may be referred to as a circuit, the receiver may be a circuit, an integrated circuit, mounted on a printed circuit board, an element in a system on a chip, mounted on a bread board, and so forth.

Figure 5:
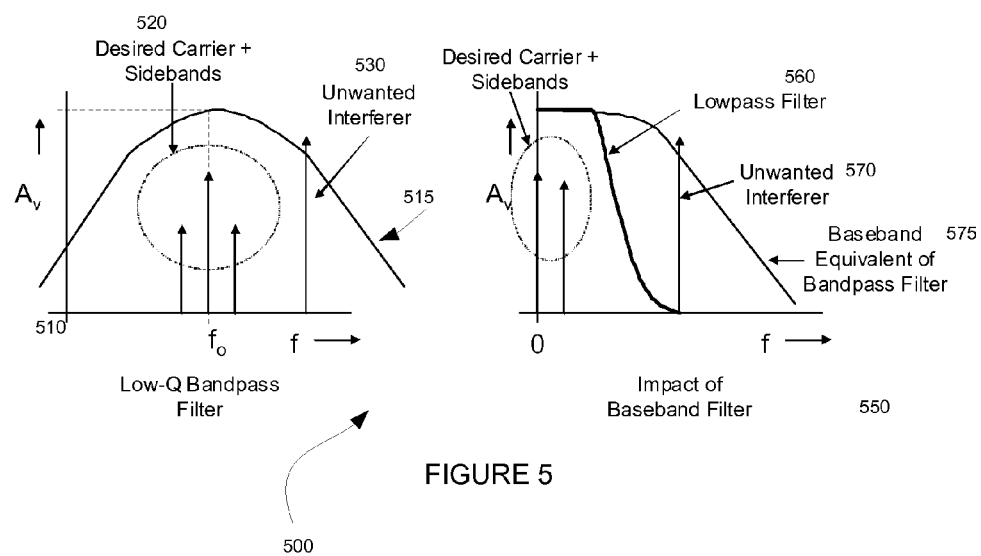
FIG. 5 is a schematic diagram of an embodiment of infrared filter transfer functions and signals, in accordance with the present disclosure.

FIG. 5 is a schematic diagram illustrating the IR filter (of FIG. 4) transfer functions and signals 500. An example of the behavior discussed above is shown in FIG. 5. In scheme 510, the band pass filter is now at a low value of Q on the order of 2, which may result in a filter transfer function 515. Additionally, a low value of Q may be approximately 10 or below. As used herein, a low-Q may be at or below a value of approximately 10 which may be a transition between when an exact circuit equation may be employed versus approximate ones. Below a Q value of approximately 10, approximations may no longer predict circuit behavior. The near-frequency interference shown as the Unwanted Interferer 530 may not be rejected by much; but high frequency interference may be substantially rejected. Additionally, as shown in scheme 510, the desired carrier and sidebands 520 may not be rejected in this example. The signal may be down-converted to the quadrature base-band where a high order low pass filter, typically on the order 3 to 5, may be applied to the signal. The signal resulting from this filter is shown as the Low pass Filter bold line 560 in scheme 550 of FIG. 5. The Low pass Filter bold line 560 may have a very steep slope as illustrated in scheme 550 of FIG. 5, much closer to the ideal "brick wall" filter. The scheme 550 may relax the band pass filter to a low-Q low-power single-resonator and may move the difficult near-frequency interference rejection problem to the lower-power and more stable base-band low pass filter circuits. As illustrated in scheme 550, the baseband equivalent of band pass filter signal 575 may not reject the unwanted interferer 570 by much. Also illustrated in scheme 550, the low pass filter signal 560 may strongly reject the unwanted interferer 570, while the desired carrier and sidebands may not be rejected by the low pass filter signal 560.

Figure 6:
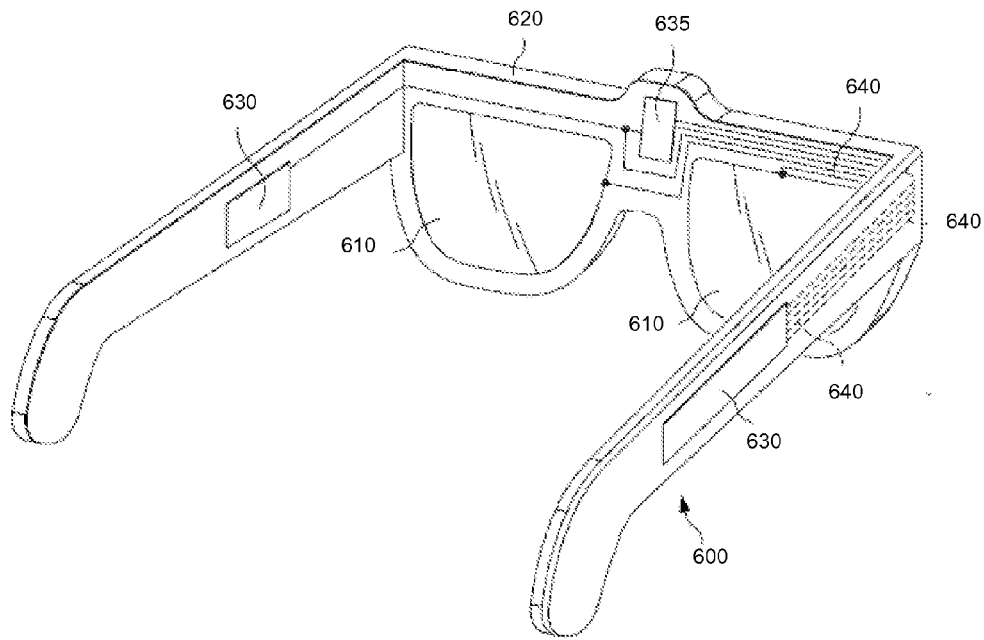
FIG. 6 is a schematic diagram of an embodiment of shutter glass eyewear, in accordance with the present disclosure.

FIG. 6 is a schematic diagram of an embodiment of shutter glass eyewear 600. The shutter glass eyewear 600 of FIG. 6 may include a first lens and a second lens 610, a frame 620, a sensor 635 and an integrated circuit 630. The integrated circuit 630 may perform a variety of functions including, but not limited to, receiving infrared signals and filtering out interference from the infrared signals. As may be referred to herein for explanatory purposes, the integrated circuit 630 may be a circuit or an integrated circuit, either or all of which may be included on a system on a chip, included on a printed circuit board, included on a bread board, and so forth.

As shown in FIG. 6, the integrated circuit 630 may be located in at least one of the shutter glass eyewear arms or in the shutter glass body and may communicate with other integrated circuits or with a sensor 635, such as, but not limited to an infrared sensor, via a wire 640 or any other type of electrical and/or optical connector known in the art. Additionally, the integrated circuit 630 may be one of multiple circuits, located in multiple places in the shutter glass eyewear 600. In one example, the integrated circuit 630 may be located in a first arm of the shutter glass eyewear 600 and may communicate with additional integrated circuits located in the nose piece and/or the second arm of the shutter glass eyewear 600. In another example, the integrated circuit 630 may be part of a system on a chip located in a first arm of the shutter glass eyewear 600 which may communicated with a sensor 635 located in the nose piece of the shutter glass eyewear 600.

Other well-known techniques for band pass filtering, such as switched-capacitor N-path filters, have some of the above advantages, but at a cost of higher power dissipation, complexity and undesired side-effects. The N-path circuits also may use a separate envelope detector and associated low pass filter which further increases overall complexity.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the disclosed principles have been described above, it should be understood that they have been presented by way of example only, and are not limiting. Thus, the breadth and scope of the embodiment(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the embodiment(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. Stereoscopic eyewear for receiving infrared signals, comprising:
   a first lens and a second lens, each of the first and second lens comprising a liquid crystal shutter;
   a circuit for passing data sidebands of infrared signals comprising:
      a band pass filter with a low value of Q operable to generate a filtered signal by filtering out a first type of interference from a received infrared signal,
      a plurality of mixers operable to receive the filtered signal from the band pass filter, wherein the plurality of mixers down converts the filtered signal to baseband signals, and
      a plurality of low pass filters operable to receive the baseband signals from the plurality of mixers, wherein the plurality of low pass filters rejects a second type of interference; and
   a frame for holding the first lens, the second lens, and the circuit for passing data sidebands of the infrared signals.

2. The stereoscopic eyewear of claim 1, wherein the first type of interference is a high frequency interference signal.

3. The stereoscopic eyewear of claim 1, further comprising an amplifier operable to adjust gain and further operable to communicate with the band pass filter.

4. The stereoscopic eyewear of claim 3, further comprising a pre-amplifier operable to convert current pulses to a voltage and further operable to communicate with the amplifier.

5. The stereoscopic eyewear of claim 4, further comprising a photodiode operable to convert light pulses to current pulses and further operable to communicate with the pre-amplifier.

6. The stereoscopic eyewear of claim 5, further comprising an AGC block operable to control the amplifier gain to stabilize the filtered signal level at the output of the band pass filter.

7. The stereoscopic eyewear of claim 5, further comprising a magnitude detector operable to communicate with the plurality of low pass filters.

8. The stereoscopic eyewear of claim 1, wherein the second type of interference is a near-carrier interference signal.

9. The stereoscopic eyewear of claim 1, wherein the band pass filter is a single resonator band pass filter.

10. The stereoscopic eyewear of claim 1, wherein the band pass filter is a low Q band pass filter.

* * * * *